United States Patent
Horstmann et al.

(10) Patent No.: US 7,231,423 B1
(45) Date of Patent: Jun. 12, 2007

(54) INTERACTIVE WIRELESS DEVICE COMMUNICATION SYSTEM FOR MEETINGS AND CONFERENCES

(75) Inventors: Jens Horstmann, Santa Clara, CA (US); Matti Katajamaki, Sunnyvale, CA (US); Saeed Zarea, San Jose, CA (US); Susan Potter, Redwood City, CA (US); Miroslav Charles Wiesner, San Jose, CA (US)

(73) Assignee: Jens Horstmann, Santa Clara, CA (US)

( * ) Notice: Subject to any disclaimer, the term of this patent is extended or adjusted under 35 U.S.C. 154(b) by 956 days.

(21) Appl. No.: 09/864,479

(22) Filed: May 23, 2001

(51) Int. Cl.
*G06F 15/16* (2006.01)
(52) U.S. Cl. ...................... 709/204; 709/213
(58) Field of Classification Search ........ 709/200–253; 705/1, 8, 9, 14
See application file for complete search history.

(56) References Cited

U.S. PATENT DOCUMENTS

| | | | | |
|---|---|---|---|---|
| 5,682,525 A | * | 10/1997 | Bouve et al. ............... | 709/217 |
| 5,717,863 A | * | 2/1998 | Adamson et al. ........... | 709/204 |
| 5,721,764 A | * | 2/1998 | Lubachevsky ........... | 379/88.25 |
| 5,799,151 A | * | 8/1998 | Hoffer ........................ | 709/204 |
| 5,822,526 A | * | 10/1998 | Waskiewicz ................ | 709/206 |
| 5,944,787 A | * | 8/1999 | Zoken ......................... | 709/206 |
| 6,011,782 A | * | 1/2000 | DeSimone et al. ......... | 370/260 |
| 6,018,346 A | * | 1/2000 | Moran et al. ................. | 705/8 |
| 6,057,841 A | * | 5/2000 | Thurlow et al. ............ | 709/204 |
| 6,105,055 A | * | 8/2000 | Pizano et al. ............... | 709/204 |
| 6,161,149 A | * | 12/2000 | Achacoso et al. .......... | 709/204 |
| 6,163,274 A | * | 12/2000 | Lindgren .................... | 340/7.29 |
| 6,230,188 B1 | * | 5/2001 | Marcus ........................ | 709/206 |
| 6,237,026 B1 | * | 5/2001 | Prasad et al. ............... | 709/204 |
| 6,308,201 B1 | * | 10/2001 | Pivowar et al. ............. | 709/214 |
| 6,317,777 B1 | * | 11/2001 | Skarbo et al. .............. | 709/204 |
| 6,347,301 B1 | * | 2/2002 | Bearden et al. ................ | 705/1 |
| 6,363,352 B1 | * | 3/2002 | Dailey et al. ................... | 705/9 |
| 6,401,085 B1 | * | 6/2002 | Gershman et al. .......... | 709/223 |
| 6,507,865 B1 | * | 1/2003 | Hanson et al. .............. | 709/204 |
| 6,643,687 B1 | * | 11/2003 | Dickie et al. ............... | 709/206 |
| 6,912,398 B1 | * | 6/2005 | Domnitz ...................... | 705/14 |
| 6,931,254 B1 | * | 8/2005 | Egner et al. ................. | 705/14 |
| 6,970,827 B2 | * | 11/2005 | Zeltzer et al. ................. | 705/1 |
| 7,047,041 B2 | * | 5/2006 | Vanska et al. ............... | 705/14 |
| 7,139,722 B2 | * | 11/2006 | Perrella et al. ................ | 705/9 |
| 2003/0191676 A1 | * | 10/2003 | Templeton ..................... | 705/8 |
| 2005/0027581 A1 | * | 2/2005 | Kjesbu et al. ................. | 705/8 |

FOREIGN PATENT DOCUMENTS

JP 11046191 A * 2/1999

OTHER PUBLICATIONS

Stanski, Peter; Giles, Stephen; and Zaslavsky, Arkady, "Document Archiving, Replication, and Migration Container for Mobile Web Users," Proceedings of the 1998 ACM Symposium on Applied Computing, ACM Press, Feb. 1998, pp. 400-404.*

(Continued)

*Primary Examiner*—Bunjob Jaroenchonwanit
*Assistant Examiner*—Victor Lesniewski
(74) *Attorney, Agent, or Firm*—Imperium Patent Works; T. Lester Wallace

(57) ABSTRACT

A conference organizer uses conference software to define a conference and to store conference information on the organizer's computer system. The stored conference information includes a list of attendees, and a personal proxy mailbox for each attendee. Each attendee has a wireless device, such as a personal digital assistant (PDA). The organizer's computer system includes a wireless communication station that can communicate in wireless fashion with the wireless devices of the attendees at the conference. During the conference, an attendee uses his/her wireless device to access the conference information, select another attendee from the list of attendees, and send the selected attendee a message such that the message is stored in the personal proxy mailbox of the selected attendee. The use of personal proxy mailboxes allows attendees to send messages to one another and to receive messages from one another without divulging their primary email addresses.

29 Claims, 2 Drawing Sheets

OTHER PUBLICATIONS

Lamming, Mik; Eldridge, Marge; Flynn, Mike; Jones, Chris; and Pendlebury, David, "Satchel: Providing Access to Any Document, Any Time, Anywhere," ACM Transactions on Computer-Human Interaction (TOCHI), vol. 7, Issue 3, ACM Press, Sep. 2000, pp. 322-352.*

Pham, Thai-Lai; Schneider, Georg; and Goose, Stuart, "A Situated Computing Framework for Mobile and Ubiquitous Multimedia Access using Small Screen and Composite Devices," Proceedings of the Eighth ACM international Conference on Multimedia, ACM Press, Oct. 2000, pp. 323-331.*

"The Mobile People Architecture," Techical [sic] Report: CSL-TR-99-777, Jan. 1999, Appenzeller, et al. pp. 1-12.

"IdentiScape: Tackling the Personal Online Identity Crisis," Technical Report: CSL-TR-00-804, Jun. 2000, Maniatis, et al. pp. 1-22.

"Supporting Mobility in Mosquito Net," Baker, et al. This paper appears in the Proceedings of the 1996 USENIX Technical Conference, San Diego, CA, Jan. 1996. pp. 1-13.

"The Mobile People Architecture," Maniatis, et al. This paper was prepared to appear in Mobile Computing and Communications Review, Jul. 1999. Pp. 1-7.

* cited by examiner

INTERACTIVE WIRELESS DEVICE COMMUNICATION SYSTEM FOR MEETINGS AND CONFERENCES

REFERENCE TO COMPACT DISC APPENDIX

The Compact Disc, which is a part of the present disclosure, includes a recordable Compact Disc (CD-R) containing files and information from which a specific embodiment of an interactive wireless device communication system for meetings and conferences can be built. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

TECHNICAL FIELD

This invention relates to wireless devices and methods therefor.

SUMMARY

A conference organizer uses conference software to define a conference and to store conference information on the organizer's computer system. The stored conference information, in one embodiment, includes a list of conference attendees, and a personal proxy mailbox for each conference attendee. Each conference attendee has a wireless device, such as a personal digital assistant (PDA). The organizer's computer system includes a wireless communication station (for example, disposed at the location of the conference such as in the conference hall) that can communicate in wireless fashion with the wireless devices of the conference attendees at the conference. During the conference, an attendee can use his/her wireless device to access the conference information, select another conference attendee from the list of attendees, and send the selected attendee a message such that the message is stored in the personal proxy mailbox of the selected attendee. The use of personal proxy mailboxes allows attendees to send messages to one another and to receive messages from one another without divulging their primary email addresses. The primary email address of an attendee may, for example, be the primary business email address of the attendee. Examples of attendees include the conference organizer, exhibitors at the conference, sponsors, speakers at the conference, and others attending the conference who are not exhibitors, sponsors, speakers or organizers.

After collecting messages and/or other information into his/her personal proxy at the conference, an attendee can use his/her wireless device and the conference software to move selected parts of the collected information from the attendee's personal proxy to another location (for example, into the attendee's primary email inbox and/or onto the attendee's personal computer). Some period of time after conclusion of the conference, attendee access to their personal proxies on the organizer's computer system is suspended and the storage space on the organizer's computer system used to store the personal proxy information is made available for other uses.

Other embodiments and novel aspects are set forth in the detailed description below. Accordingly, this summary does not purport to define the invention. The invention is instead defined by the claims.

DETAILED DESCRIPTION OF THE PREFERRED EMBODIMENTS

Example 1

Figure 1:
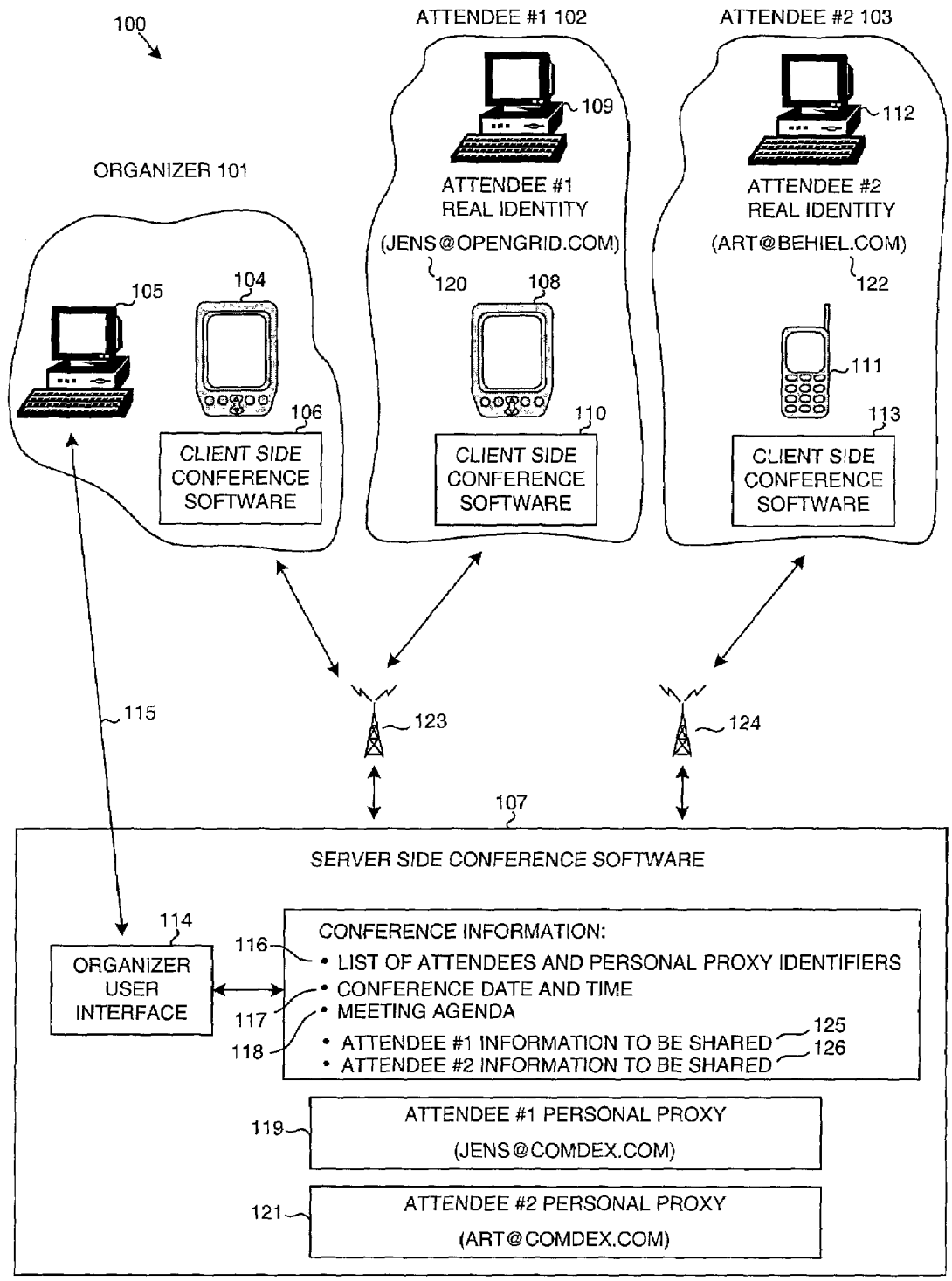
FIG. 1 is a diagram of an interactive wireless device communication system for meetings and conferences in accordance with one embodiment.

FIG. 1 is a diagram of a first example of a conference system 100. Conference system 100 involves software executing on a computer system of a conference organizer 101 as well as software executing on computer systems of attendees 102 and 103. The conference software executing on the organizer's computer system in this embodiment is the very same software as the software executing on the computer system of each attendee. In each system, there is software (sometimes called "client side" software) that executes on a wireless device and there is other software (sometimes called "server side" software) that executes on a computer such as a desktop computer or network of computers. In the illustrated example of FIG. 1, the organizer 101 has a wireless device 104 and a desktop personal computer 105.

Client side conference software 106 executes on wireless device 104 whereas server side software 107 executes on desktop personal computer 105. Attendee #1 102 also has a wireless device 108 and a desktop personal computer 109. Wireless device 108 executes client side conference software 110 whereas desktop personal computer 109 executes server side software identical to the software executing on personal computer 105. Attendee #2 103 also has a wireless device 111 and a desktop personal computer 112. Wireless device 111 executes client side conference software 113 whereas desktop personal computer 112 executes server side software identical to the software executing on personal computer 105. All of computers 105, 109 and 112 are coupled to a network (most likely the Internet) such that they can send information to one another via the network if instructed to do so.

Wireless devices 104 and 108 are personal digital assistant (PDA) devices whereas wireless device 111 is a wireless-application-protocol (WAP) telephone. Client side software 106 and 110 may therefore be different from client side software 113 in that it executes on a different hardware platform. It is substantially the same, however, in the way that it communicates with the server side software.

Figure 2:
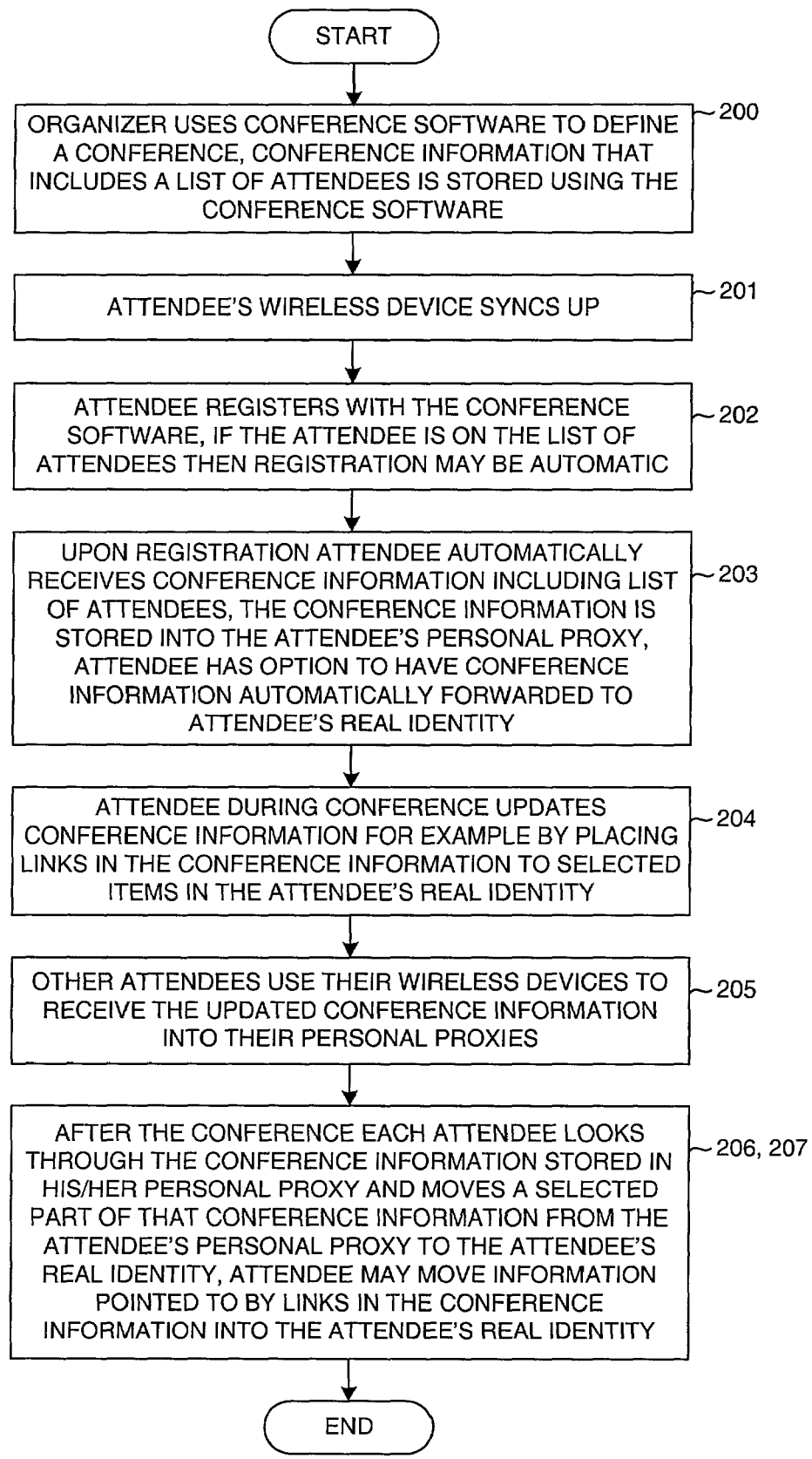
FIG. 2 is a flowchart of a method carried out by the system of FIG. 1.

FIG. 2 is a flowchart in accordance with the embodiment of FIG. 1. Organizer 101 uses an organizer user interface 114 of server side software 107 executing on the organizer's computer system to define a conference (step 200). This setting up of the conference may be done either via the wireless device 104 or the desktop computer 105. Arrow 115 in FIG. 1 represents the organizer's defining the conference using the screen and keyboard of desktop computer 105.

In one embodiment, the organizer defines the conference by specifying a list of conference attendees 116 and a conference date and time 117. Organizer 101 may also enter other conference information including a conference agenda 118. An attendee may wish to share certain information with the others at the conference. This information may include background information on the attendee, a digital business card, a picture of the attendee, biographical information on the attendee, emails or other communications, information on products or services offered by the attendee, advertising material, technical specifications, and/or written work product of the attendee. Information to be shared may include written textual information, video information, digital pictures, audio information or other types of information stored in digital form.

In the example of FIG. 1, organizer 101 uses user interface 114 to compile such information from attendees #1 and #2 in such a manner that the agenda 118 includes, for each attendee, detailed information on each attendee and a summary of what each attendee will contribute or share or present at the conference. The agenda 118 in one embodiment is a plurality of interlinked web pages. A top-level web page of the agenda may, for example, for each attendee include a link or links to the information that that attendee wishes to share. A viewer of the web-based agenda 118 can access web-based agenda 118, select an attendee of interest, and then click on a link to access additional web-pages for that attendee, where the additional web pages include the more detailed information to be shared. The server side software 107 provides, through user interface 114, assistance in making such a web-based agenda that incorporates information to be shared from the various attendees into the web-based agenda.

The agenda may, for example, be a schedule or time table of a conference, where some of the attendees are speakers and where links associated with each speaker can be selected to find more detailed information on the topic to be presented by the speaker. In another example, the conference may be a convention or trade show where some of the attendees are exhibitors and where links associated with each exhibitor can be selected to find more detailed information on products offered by the exhibitor. In another example, the conference may be a business meeting where some of the attendees are reporting their progress on certain action items and where links associated with each reporting attendee can be selected to find a detailed report prepared by the attendee on the action item.

In the example of FIG. 1, each attendee has a "real identity" as well as a "personal proxy." The personal proxy is maintained on the organizer's computer system. The personal proxy 119 for attendee #1 in the example of FIG. 1 is a mailbox and storage space identified as "JENS@COMDEX.COM". This "JENS@COMDEX.COM" mailbox and storage area is a "proxy" in the sense that it, at least to some degree, allows attendee #1 to receive information and communicate with others at the conference without divulging the real identity 120 of attendee #1 ("JENS@OPENGRID.COM") to others at the conference. In this example, JENS@OPENGRID.COM is the primary business email address of attendee #1. Attendee #1 does not want others at the conference to be able to send attendee #1 unwanted advertisements and solicitations to the attendee's primary email address because such voluminous solicitations would obscure more important communications attendee #1 might receive via JENS@OPENNGRID.COM. Attendee #2 also has a personal proxy 121 and a real identity 122.

One or more wireless communication stations 123 and 124 are disposed at the physical location of the conference. These wireless communication stations 123 and 124 are coupled to the organizer's computer system. The wireless communication stations are, in one embodiment, relatively low power RF transmitters/receivers that are adequately powerful to provide communication with the wireless devices within the conference location, but are not so powerful that they transmit much beyond the conference location. In some embodiments, the wireless communication stations are infrared beaming stations (for example, Clarinet EtherIR Star 1000 devices that have wired Ethernet connections to the organizer's computer system).

An attendee on the list of attendees 116 travels to the conference place with his/her wireless device. Alternatively, attendees can rent, purchase, or borrow a suitable wireless device at the conference place. In any case, when the wireless device of the attendee comes within a communication range of a wireless communication station at the conference place, wireless communication is established (step 201) with server side software 107 of the organizer's computer system. If an attendee #1 is on the list of attendees 116, then attendee #1 is registered (step 202) with the conference software executing on the organizer's computer system. In some embodiments, attendee #1 must be manually registered by personnel at a greeting desk at the conference such that the personnel registers the attendee via desktop computer 105. In other embodiments, the organizer computer system sends the wireless device of the attendee a request to register. The attendee so alerted may then use his/her wireless device to send a communication back to the organizer's computer system that causes the attendee to be registered. In other embodiments, the attendee is automatically registered by the organizer's computer system when communication is established with the attendee's wireless device.

Upon registration, the organizer computer system sends updated conference information (step 203) to the attendee's wireless device. The updated conference information may, for example, include an up-to-date version of agenda 118 and an up-to-date version of the list of attendees 116. A copy of this updated conference information may be moved into the personal proxy of the attendee.

In the illustrated example of FIG. 1, attendee #2 103 is also present and registered at the conference, the wireless device 111 of the attendee #2 being in wireless communication with wireless communication station 124. Attendee #1 102 has provided information to be shared 125. Attendee #2 103 has provided information to be shared 126.

In the method of FIG. 2, attendee #1 during the conference updates (step 204) his/her information to be shared 125. Attendee #1 may do this at the conference using wireless device 108. In the case where attendee #1 is a participant in a business meeting, attendee #1 may learn that another participant would like access to certain information that resides on the computer system 109 of the first attendee. First attendee #1 may therefore use wireless device 108 at the business meeting to provide a link (the link is present in the information to be shared 125) to that information such that another participant at the business meeting can use the link to access the information. Alternatively, attendee #1 may use wireless device 108 to instruct software executing on desktop computer 109 to move selected information from desktop computer 109 to the organizer's computer system so that the other participant can access it there.

In the case where attendee #1 is an exhibitor at a trade show convention, attendee #1 may use desktop computer 109 to change his/her digital exhibit information for certain products or services. The exhibitor (attendee #1) may use the web-based interface of the software executing on the organizer's computer system to change this exhibit information. In the situation where the information to be shared by attendee #1 is incorporated into the part of the agenda reserved for attendee #1, the ability to change the information to be shared once the conference is in progress allows attendee #1 (in this case attendee #1 is an exhibitor) to update his/her portion of the agenda rapidly without requiring intervention of the conference organizer.

In the example of FIG. 2, attendee #2 accesses the updated conference information (step 205) as updated by attendee #1. Where attendee #1 is a participant in a business meeting and provides a link to information on computer 109, attendee #2 can use the link to access the information on computer 109. Alternatively, attendee #1 may have moved information from computer 109 to be part of "attendee #1 information to be shared" 125. Attendee #2 then accesses the information in "attendee #1 information to be shared" 125. Alternatively, attendee #1 may have moved information from computer 109 directly into the personal proxy 121 of attendee #2. This may be accomplished, for example, by sending an email-like message containing the information from computer 109 to ART@COMDEX.COM, where attendee #1 causes this email-like message to be sent using wireless device 108.

In this way, the conference software and the wireless devices provide a mechanism for attendees at the conference to exchange information. An attendee carrying only a wireless device can walk around a convention and exchange information with another attendee carrying only a wireless device. Similarly, two attendees at a business meeting can exchange information using only wireless devices. The entry for an attendee in the list of attendees may include the personal proxy name (JENS@COMDEX.COM is a personal proxy name in this example) of the attendee such that other attendees can select that personal proxy name as a destination address for a message.

In the example of FIG. 2, once the information from attendee #1 is present in personal proxy 121 of attendee #2, attendee #2 moves at least some of that information from personal proxy 121 to the real identity 122 (step 206) of attendee #2. Attendee #2 can use wireless device 111 or desktop computer 112 to initiate this move of information.

In one example, attendee #2 collects a great deal of information at a trade show conference. The information is collected into personal proxy 121 in the form of stored files. Attendee #2 leaves the conference and returns to his/her office. Desktop computer 112 is located at the office. Attendee #2 uses desktop computer 112 to review the information in personal proxy 121. Attendee #2 uses the conference software executing on desktop computer 112 to move selected parts of that information from personal proxy 121 on the organizer's computer system to a storage location of computer 112. Attendee #1 does the same. Attendee #1 looks through information stored in the personal proxy 119 of attendee #1 and moves (step 207) selected parts of that information from personal proxy 119 on the organizer's computer system to a suitable storage location on computer 109.

After a certain amount of time, the server side conference software 107 executing on the organizer's computer system deletes all personal proxies including personal proxies 119 and 121. Attendees that wish to retain information in their personal proxies therefore must move that information to another suitable storage location before the organizer computer system deletes the information in the personal proxies.

In other embodiments, the organizer computer system sends attendees potentially interesting information prior to deletion, or sends attendees an alert prior to deletion.

In some embodiments, the organizer 101 is one of the attendees and wireless communication station 123 is disposed in a conference room within the organizer's office. Each business meeting taking place in the conference room is defined in the conference software by a conference date and time and a list of attendees. In one embodiment, the conference software is part of an office software suite. The conference software may, for example, work in conjunction with or be incorporated into a program such as Microsoft's Outlook program. Rather than just synching conference information into a regular folder in Outlook, the conference software provides a virtual folder accessible through Outlook that contains, on a per-conference basis, conference information (conference information includes, among other things, contacts, a calendar, notes, and messages). Such integration with Outlook allows the attendee to create an overlay with another regular Outlook folder such that the attendee can move (e.g., drag and drop) selected items from the virtual folder to the other regular folder, where both the virtual folder and the regular folder are accessible from Outlook.

Although the collection of information using personal proxies is explained here as being collected on the organizer's computer system, the information may also be collected elsewhere. For example, the conference software provides an option to each attendee to have information flowing into the attendee's personal proxy forwarded straight through the personal proxy and directly to another destination. The attendee, for example, enters the real identity (for example, another email address) into the conference software such that information flowing into the personal proxy is automatically forwarded to the real identity. When this forwarding option is selected, the conference software still serves to allow others at the conference to send information to the attendee without the others ever knowing the ultimate destination for the information. The information, however, rather than being stored on the organizer's computer system, is stored elsewhere (for example, on the computer system of the attendee).

Example 2

A second example of a conference system is now described. The server-side conference software is different from the client-side conference software. In one specific embodiment, the computer system upon which the server-side software executes includes a DELL server coupled to the internet, a Sun Solaris database server, a local computer system at the conference location that is coupled to the internet, a 802.11 wireless access point device, and an IR beaming station. The server-side conference software executes on top of Weblogic application server software that in turn runs on a Windows 2000 operating system that in turn runs on the DELL server. This server-side conference software provides a web-based interface. The conference organizer uses the local computer at the conference location to access the DELL server via the Internet and the web-based interface. The server-side software running on the DELL server communicates with an Oracle database (another part of the server-side software) running on the Sun Solaris database server. The conference information (for example, the list of attendees, the list of exhibitors, product information, the conference agenda, agendas personalized by attendees, attendee buddy lists, session data, attendee message inboxes and message outboxes) is stored on the Sun Solaris database server. Both the 802.11 wireless access point and the IR beaming station are located at the conference location and are coupled via Ethernet connections to the local computer.

The attendee wireless devices in one specific system of Example 2 include: 1) laptop computers, 2) Compaq iPaq pocket PCs, and 3) Palm OS based PDA devices. The laptop computers and iPaq pocket PCs communicate in wireless fashion with the 802.11 wireless access point. The wireless access point may, for example, be a wireless access point available from IBM, CISCO or Linksys. The Palm OS based PDA devices communicate with the IR beaming station using the IrOBEX infrared communication protocol. The IR beaming station may, for example, be an IR beaming station available from Clarinet Systems. The conference system of Example 2 may include multiple such IR beaming stations and multiple such 802.11 wireless access points.

Using a wireless device at the conference, a first attendee can select a second attendee's name from a list of attendees, compose a message to the second attendee, and send the message to a personal proxy mailbox of the second attendee without knowing the primary email address of the second attendee. The second attendee can then respond to the first attendee using the second attendee's personal proxy mailbox name as the source of the message such that the first attendee does not learn the primary email address of the second attendee. Accordingly, a conference attendee can communicate by sending and receiving messages without divulging the attendee's real identity (for example, without divulging the attendee's primary email address). Although the personal proxy mailboxes may be usable by attendees for some period of time before and after the conference, the personal proxy mailboxes are only accessible for a time period that is roughly coextensive with the duration of the conference.

The Compact Disc Appendix (the entire contents of the Compact Disc Appendix is part of this patent document and is hereby expressly incorporated by reference into this patent document) includes client-side conference software in accordance with Example 2 (executes on the attendee wireless devices) as well as server-side conference software in accordance with Example 2 (executes on the organizer's computer system). The following listing of directories and sub-directories describes briefly the contents of each directory and sub-directory of a CD appendix that includes the source code for a specific working embodiment of the invention. The source code is annotated with further descriptive language, and is fully enabling.

Files within the following "palm" directory contain client software that resides on a portable digital assistant that runs the Palm Operating System, or Palm OS®.

./palm/app/common:
These files are "common" in the sense that they are shared among the various software components running on the client Palm-enabled device. Shared, or "common," resources include global variables and global properties. Shared resources also include common functionalities, such as sending messages from one layer to another.

./palm/app/messaging:
This software facilitates messaging. For example, this software forwards messaging requests to an infrared communication engine for forwarding to a server.

./palm/app/profile:
This software allows client-side users to log into the system.

./palm/app/session:
A session is a presentation to a group of people at a conference. This software includes a session engine that orders and retrieves specific sessions defined by a conference organizer.

./palm/app/util:
This directory contains a utility that decomposes strings.

./palm/comm:
This directory contains a communication (or "comm") layer. In general, the comm layer returns the appropriate classes to handle networking or data-layer operations.

./palm/comm/db:
This directory contains communication software that returns the appropriate classes to handle profiles, preferences, session data, messages, and user data.

./palm/comm/net:
This directory contains communication software that returns the appropriate classes to handle lower-level IR functionality (infra-red communication between client and server).

./palm/structs:
This directory contains data structures that define the physical layouts for related collections of data.

./palm/ui:
This directory contains objects defining the client-side user interface.

./palm/ui/comp:
This directory includes components that allow the client user to customize the palm user interface.

Files within the following "server" directory contain server software that resides on a server that runs Win2000 Server (also Solaris). The application servers are clustered to handle server failover.

./server/cachemgr:
This directory includes a cache manager that speeds requests for frequently accessed information, such as lists of conference attendees.

./server/clarinet:
Clarinet Systems, Inc.® is a company that provides IR connectivity to enable users of handheld appliances, such as those using the Palm OS®, to communicate over a network. The various "clarinet" directories include IR connectivity software from or adapted from Clarinet Systems, Inc.®

./server/ejb:
Enterprise JavaBeans (ejb) is a specification for creating server-side scalable, transactional, multi-user secure enterprise-level applications. The objects in the ejb directories encapsulate the data models and the business logic of this software.

./server/i18n:
This directory contains an internationalization object that simplifies adapting this software to communicate with users in different languages (e.g., Spanish and English).

./server/interfaces:
  This directory includes software that facilitates access to objects that define a data model layer, a business logic layer, and an interface layer.

./server/internal:
  This directory includes software that changes string format.

./server/jsp:
  JSP stands for JavaServer Pages™. This directory includes JSP administration interface pages and forms that allow users or marketing people to add users or components.

./server/locale:
  This directory includes software related to internationalization, including a unique set of properties for each supported language.

./server/mailsetup:
  This directory contains an object that provides communication with a mail server. The object manages the mail server, e.g. facilitating the creation, maintenance, and deletion of mail accounts.

*/server/messaging:
  This directory includes an object that allows users to send, receive, reply, or delete messages.

./server/objects:
  This directory includes data structures used by the entire server system.

./server/ogirproxy:
  This directory includes a software proxy that facilitates communication between the application server and the IR connectivity software.

./server/palmutils:
  This directory includes a number of utilities that convert data and information into the Palm database (pdb) format.

./server/request:
  This directory includes software that parses types of user requests and calls functions to prepare responses to the requests.

./server/servlets:
  This directory includes objects that handle client requests by communicating with EJBs through the interfaces and composing reply messages in a format understood by clients.

./server/systmgr:
  Enables Enterprise JavaBeans and application server processes running on different hardware to share information in a clustering setup.

./server/util:
  This directory includes objects used by the application server.

./ui:
  The "ui" directories define the server user interfaces. There are several types to facilitate use with different types of devices.

The organizer's computer system in this case includes the DELL server, the Sun Solaris server, the local computer, the 802.11 wireless access point coupled to the local computer, and the IR beaming station coupled to the local computer despite the fact that part of the system may be operated by an entity other than the conference organizer. Additional details on the conference system of Example 2 are found on the Compact Disc Appendix in the documents entitled: 1) "API Document For Interactive Wireless Device Communication System for Meetings and Conferences"; and 2) "Calypso Client-Side Design (Palm)". Paper copies of these documents are also submitted herewith, and are also incorporated herein by reference. The API Document contains comments, definitions, and a psuedocode computer program listing.

Although the invention is described above in connection with specific exemplary embodiments, the present invention is not limited thereto. Any suitable type of wireless communication station can be employed. The particular wireless communication stations in the examples above are but examples. Similarly, any suitable type of wireless device can be employed. The particular wireless devices in the examples above are but examples. The conference organizer's computer system may involve a single hardware server platform and associated wireless communication device, or may involve multiple computer systems that are coupled together via a network or networks. Accordingly, various modifications, adaptations, and combinations of various features of the described embodiments can be practiced without departing from the scope of the invention as set forth in the claims.

What is claimed is:

1. A method, comprising:
  (a) using conference software executing on an organizer computer system to define a conference and to store conference information associated with the conference, the conference information including a list of attendees, the conference information being stored on the organizer computer system;
  (b) at the conference a wireless device of a first attendee establishes wireless communication with the organizer computer system;
  (c) if the first attendee is on the list of attendees then the first attendee is registered with the conference software, each attendee registered has a personal proxy and a real identity;
  (d) upon registration the first attendee receives access to updated conference information via the first attendee's wireless device, the updated conference information including the list of attendees, at least a part of the updated conference information being moved into the personal proxy of the first attendee;
  (e) the first attendee during the conference updates the conference information by modifying first attendee sharing information within the conference information, the first attendee sharing information being information provided by the first attendee that is shared with other attendees, the first attendee sharing information being stored on the organizer computer system;
  (f) a second attendee having a registered wireless device accesses the conference information as updated in (e) and moves at least part of the first attendee sharing information into the personal proxy of the second attendee;
  (g) the second attendee looks through conference information stored in the second attendee's personal proxy and moves a selected part of that information to the second attendee's real identity; and
  (h) the first attendee looks through conference information stored in the first attendee's personal proxy and moves a selected part of that information to the first attendee's real identity.

2. The method of claim 1, wherein the first attendee uses the first attendee's wireless device to update the conference information in (e).

3. The method of claim 1, wherein the first attendee uses a personal computer to update the conference information in (e), the personal computer being coupled to the organizer computer system via the internet.

4. The method of claim 1, wherein the wireless device of the first attendee is taken from the group consisting of a WAP phone or a PDA, and wherein the wireless device of the second attendee is taken from the group consisting of a WAP phone or a PDA.

5. The method of claim 1, wherein a conference organizer defines the conference in step (a), the conference organizer also being an attendee on the list of, attendees, the conference organizer attending the conference and having a registered wireless device.

6. The method of claim 1, wherein a conference organizer defines the conference in step (a) by entering the list of attendees using the conference software and by entering a conference time using the conference software.

7. The method of claim 1, wherein the personal proxy of an attendee includes storage space disposed on the organizer computer system where the attendee can store conference information, and wherein the real identity of an attendee includes a second storage space identified by an email address, the attendee using the second storage space to store more than information associated with the conference.

8. The method of claim 1, wherein the personal proxy of an attendee includes a first mailbox, and wherein the real identity of the attendee is a second mailbox.

9. The method of claim 1, wherein the first attendee updates the conference information in (e) by providing links to selected information stored on a computer other than the organizer computer system.

10. The method of claim 1, wherein the first attendee updates the conference information in (e) by moving the first attendee sharing information from the first attendee's real identity to the organizer computer system, the first attendee using the first attendee's wireless device to initiate the move.

11. The method of claim 1, wherein the part of the updated conference information moved into the personal proxy of the first attendee in (d) is an agenda of the conference.

12. The method of claim 1, wherein the part of the updated conference information moved into the personal proxy of the first attendee in (d) is an electronic business card of an attendee.

13. The method of claim 1, wherein the conference information stored on the organizer computer system includes a message board, the message board being accessible by the first attendee using the first attendee's wireless device, the message board being accessible by the second attendee using the second attendee's wireless device, the message board containing messages for multiple attendees.

14. A system comprising:
a computer system comprising a wireless communication station, the wireless communication station being disposed at a conference location, the computer system storing a list of conference attendees, the computer system maintaining a personal proxy mailbox for an attendee on the list of conference attendees, the attendee having another mailbox that is not maintained by the computer system, wherein the computer system stores information about an exhibit of a first conference exhibitor and stores information about an exhibit of a second conference exhibitor, the computer system having an interface that allows the first conference exhibitor to modify the information about the exhibit of the first conference exhibitor but does not allow the first conference exhibitor to modify the information about the exhibit of the second conference exhibitor, and wherein the interface allows the second conference exhibitor to modify the information about the exhibit of the second conference exhibitor but does not allow the second conference exhibitor to modify the information about the exhibit of the first conference exhibitor; and
a wireless device that communicates at the conference location with the wireless communication station, the wireless device being usable: 1) to retrieve an indication of the personal proxy mailbox from the computer system, and 2) to send a message to the personal proxy mailbox of the attendee using the indication of the personal proxy mailbox retrieved from the computer system.

15. The system of claim 14, wherein the indication of the personal proxy mailbox is the name of the personal proxy mailbox maintained on the computer system, the indication of the personal proxy mailbox being retrieved by the wireless device as part of the list of conference attendees, wherein the other mailbox is the primary business email address of the attendee.

16. The system of claim 14, wherein the computer system stores a conference agenda, the wireless device being usable to retrieve and display the conference agenda.

17. The system of claim 14, wherein the computer system is usable by a conference organizer to define the conference by entering the list of conference attendees.

18. The system of claim 15, wherein the attendee has a name, and wherein the indication of the personal proxy mailbox has a first part and a second part, the first part being indicative of the name of the attendee, the second part being indicative of a conference name.

19. The system of claim 14, wherein the computer system maintains a message board, the wireless device being usable to place a message on the message board, the wireless device being usable to read a message from the message board.

20. The system of claim 14, wherein the computer system stores a map of the conference location, the wireless device being usable to retrieve from the computer system and to display the map on the wireless device.

21. A set of computer-executable instructions stored on a computer-readable medium, the set of computer-executable instructions being for performing the steps of:
maintaining a list of conference attendees on a conference organizer's computer system, each of the conference attendees having a corresponding wireless device;
maintaining on the conference organizer's computer system a personal proxy mailbox for each of the conference attendees on the list of conference attendees;
interfacing the conference organizer's computer system with a wireless communication station such that the conference organizer's computer system can communicate in wireless fashion with the wireless devices of the conference attendees when the wireless devices are present at a conference;
registering conference attendees on the list of conference attendees; and
allowing a first wireless device of a first registered conference attendee to select a second registered conference attendee from the list of conference attendees and to send a message to the personal proxy mailbox of second registered conference attendee, wherein the second registered conference attendee has a primary email address other than the personal proxy mailbox of the second registered conference attendee, the primary email address of the second registered conference attendee not being divulged to the first registered conference attendee, wherein the second conference attendee can use his/her wireless device to move selected information from his/her personal proxy mailbox into his/her primary email address.

22. The set of computer-executable instructions of claim 21, wherein the conference has a duration, and wherein the conference organizer's computer system allows a conference attendee to access his/her personal proxy mailbox only for a period of time that roughly corresponds to the duration of the conference.

23. The set of computer-executable instructions of claim 21, wherein the conference has a name, each personal proxy name having a first part and a second part, the first part being indicative of a name of a conference attendee, the second part being indicative of the name of the conference, and wherein the email mailbox of an attendee is the primary business email address of the attendee.

24. The set of computer-executable instructions of claim 21, wherein each conference attendee is provided a personal proxy by the conference organizer's computer system, each personal proxy including a personal proxy mailbox and also including a storage area.

25. A method comprising:
  maintaining a plurality of personal proxies for a conference, each of the personal proxies having a personal proxy name, each of the personal proxies being maintained on a computer system and being associated with a respective one of a plurality of attendees of the conference, each of the attendees also having an email mailbox that is different than the personal proxy of the attendee and that is not maintained on or by the computer system, each of the attendees having a wireless communication device;
  providing a wireless communication link between the wireless communication devices of the attendees and the computer system, each attendee being able to access his/her personal proxy on the computer system using his/her wireless communication device, wherein the conference has a duration, wherein each attendee is allowed to access his/her personal proxy only for a period of time that roughly corresponds to the duration of the conference; and
  providing the personal proxy names to the attendees of the conference, each attendee being able to view the personal proxy names using his/her wireless communication device.

26. The method of claim 25, wherein the conference has a name, each personal proxy name having a first part and a second part, the first part being indicative of a name of the conference attendee, the second part being indicative of the name of the conference, and wherein the email mailbox of an attendee is the primary business email address of the attendee.

27. The method of claim 25, wherein each personal proxy of the plurality of personal proxies includes a mailbox and a storage area.

28. A set of computer-executable instructions stored on a computer-readable medium, the set of computer-executable instructions being for:
  maintaining on a conference organizer's computer system a personal proxy for each of a plurality of conference attendees, wherein each personal proxy has a personal proxy name, and wherein each personal proxy includes a mailbox and a storage area, each of the attendees also having an email mailbox that is different than the personal proxy of the attendee and that is not maintained on or by the computer system, each of the attendees having a wireless communication device;
  registering a conference attendee when a communication is established between the conference organizer's computer system and the wireless device of the conference attendee;
  providing a list of conference attendees to the conference attendee such that the conference attendee can view the list on his/her wireless device, wherein the list includes the personal proxy names of the personal proxies maintained on the conference organizer's computer system;
  allowing the conference attendee to use his/her wireless device to move selected information from his/her personal proxy on the conference organizer's system into his/her wireless device; and
  allowing the conference attendee to use his/her wireless device to move selected information from his/her personal proxy on the conference organizer's system into his/her email mailbox.

29. The set of computer-executable instructions of claim 28, wherein the set of computer-executable instructions is also for:
  after the conference, the organizer's computer system sending the conference attendee an alert of an upcoming deletion of information in the conference attendee's personal proxy.

* * * * *